US008479878B2

(12) United States Patent
Schlosser

(10) Patent No.: US 8,479,878 B2
(45) Date of Patent: Jul. 9, 2013

(54) CHANNELING GAS FLOW TUBE

(75) Inventor: Thomas George Schlosser, Renton, WA (US)

(73) Assignee: Parallaxial Innovation LLC, Renton, WA (US)

( * ) Notice: Subject to any disclaimer, the term of this patent is extended or adjusted under 35 U.S.C. 154(b) by 0 days.

(21) Appl. No.: 13/540,492

(22) Filed: Jul. 2, 2012

(65) Prior Publication Data

US 2012/0273297 A1  Nov. 1, 2012

Related U.S. Application Data

(63) Continuation-in-part of application No. 12/238,253, filed on Sep. 25, 2008, now Pat. No. 8,210,309.

(51) Int. Cl.
*F41A 21/30*  (2006.01)
*F01N 1/08*  (2006.01)
*F41A 21/00*  (2006.01)
*F01N 1/00*  (2006.01)

(52) U.S. Cl.
USPC .......................................... 181/223; 181/270

(58) Field of Classification Search
USPC ................. 181/232, 223, 247, 248, 262, 270, 181/283, 263
See application file for complete search history.

(56) References Cited

U.S. PATENT DOCUMENTS

| 916,885 | A | * | 3/1909 | Maxim | 181/223 |
|---|---|---|---|---|---|
| 951,770 | A | * | 3/1910 | Miller | 181/253 |
| 956,906 | A | * | 5/1910 | Sizer | 181/253 |
| 981,584 | A | * | 1/1911 | Miller | 181/253 |
| 1,017,003 | A | * | 2/1912 | Kenney | 181/223 |
| 1,025,251 | A | * | 5/1912 | Desmond | 123/41.64 |
| 1,250,434 | A | * | 12/1917 | Connet | 181/223 |
| 1,427,802 | A | * | 9/1922 | Goodwin | 181/223 |
| 1,605,864 | A | * | 11/1926 | Steinegger | 89/14.3 |
| 1,611,475 | A | * | 12/1926 | Maxim | 181/249 |
| 1,835,053 | A | * | 12/1931 | Ernest | 181/262 |
| 1,924,605 | A | * | 8/1933 | Haas et al. | 181/247 |
| 2,013,956 | A | * | 9/1935 | Heath | 181/262 |
| 2,101,848 | A | * | 12/1937 | Green | 89/14.5 |
| 2,248,456 | A | * | 7/1941 | Harris | 181/262 |
| 2,286,683 | A | * | 6/1942 | McCurdy | 181/255 |
| 2,375,180 | A | * | 5/1945 | Vigo | 417/151 |
| 2,450,212 | A | * | 9/1948 | Thomas | 181/262 |
| 2,511,359 | A | * | 6/1950 | McLeod | 181/262 |
| 2,514,996 | A | * | 7/1950 | Faust, Jr. | 181/223 |
| 2,548,563 | A | * | 4/1951 | Smith | 181/262 |
| 3,492,912 | A | * | 2/1970 | Ashbrook | 89/14.3 |

(Continued)

FOREIGN PATENT DOCUMENTS

FR  2732070 A1  9/1996

*Primary Examiner* — Edgardo San Martin
(74) *Attorney, Agent, or Firm* — Galvin Patent Law LLC; Brian R. Galvin

(57) ABSTRACT

A tube for moving gas between an entry end into which gas is introduced and an exit end through which gas exits the tube, the tube comprising a plurality of adjoining adjacent☐ guides, each guide comprising an outer half of a smoothly-curved, modified torus, and an outer rigid tube wall. Each guide forms an internal cavity with a cavity mouth opening into an inner portion of the tube, the cavities shaped such that a vortex forms within each of the cavities as gas passes through the tube, and the flow of fluid in the tube is unidirectional and axial from the entry end to the exit end.

4 Claims, 14 Drawing Sheets

U.S. PATENT DOCUMENTS

| | | | |
|---|---|---|---|
| 3,667,570 A * | 6/1972 | WerBell, III | 181/223 |
| 3,767,006 A * | 10/1973 | Perrine | 181/225 |
| 3,779,339 A * | 12/1973 | Johnson | 181/276 |
| 3,786,895 A * | 1/1974 | Perrine | 181/223 |
| 4,286,689 A * | 9/1981 | Malmsten | 181/232 |
| 4,291,610 A * | 9/1981 | Waiser | 89/14.4 |
| 5,269,132 A * | 12/1993 | Loucks | 60/204 |
| 5,679,916 A * | 10/1997 | Weichert | 89/14.4 |
| 5,824,972 A * | 10/1998 | Butler | 181/279 |
| 6,347,609 B1 * | 2/2002 | Bloomer | 123/184.57 |
| 8,133,277 B2 * | 3/2012 | Scholz et al. | 623/11.11 |
| 8,210,309 B1 * | 7/2012 | Schlosser et al. | 181/232 |

\* cited by examiner

CHANNELING GAS FLOW TUBE

RELATED APPLICATIONS

This application is a continuation-in-part of U.S. patent application Ser. No. 12/238,253, titled "CHANNELING GAS FLOW TUBE", filed on Sep. 25, 2008 and issuing on Jul. 3, 2012 as U.S. Pat. No. 8,210,309, the entire specification of which is incorporated herein by reference.

BACKGROUND OF THE INVENTION

1. Field of the Invention

This invention pertains to tubes through which a fluid may move, and more particularly, to such a tube that channels gases, and articles suspended in a gas flow, centrally or axially down the tube.

2. Discussion of the State of the Art

Backpressure in engine exhausts is a well-known phenomenon that robs energy from the engine. Mufflers and catalytic converters contribute to the backpressure. It is a primary object of the present invention to provide a tube functional as an exhaust pipe that reduces backpressure and reduces or eliminates the need for a muffler.

More generally, many devices known in the art rely on fluid flow, mufflers being one example. Other examples where fluid flow may have deleterious effects include, but are not limited to, firearms (shock waves in barrels reduces kinetic energy of projectile fired and causes extreme noise), projectile flight (drag on projectile reduces range and may destabilize flight), aircraft wings and other airfoils (drag reduces efficiency and turbulence may adversely impact left generated by an airfoil), terrestrial vehicles (drag reduces efficiency), and jet engines (again, drag from fluid flows reduces efficiency). What is needed is a way to reduce deleterious effects of turbulence and shock waves in systems relying on fluid flows, to improve the efficiency or effectiveness of those systems.

SUMMARY OF THE INVENTION

A tube includes a series of guides with each successive guide smaller than a next prior guide. The tube thus forms an effective funnel ending at a tube exit end smaller than a tube entry end. The guides are arranged longitudinally with a smaller end extending toward the exit end extending into a larger end of a next adjacent guide. The larger end of the next adjacent guide extends past the smaller end of its prior flow guide and loops back to taper into smooth connection with the outside of the smaller end of that prior flow guide therein creating a cavity in the guide. In effect, various embodiments of the invention serve to employ turbulence as a work function to achieve flow and thrust structure modification, by idealizing fluid dynamic interactions into organized geometric structures in a flow continuum. When the flow/waveguide is geometrically configured in a fashion consistent with and sympathetic to the ideal geometry of the fluid dynamic instability being groomed, the flow vector forces also become organized and may be directed in a manner that provides allowing an engineered flow continuum protocol providing a benefit such as energy efficiency or shock wave absorption and translation to a fluid continuum with a higher degree of forward momentum. Put another way, the invention provides an effect analogous to Faraday's Law, in which changes in a magnetic field induce electric current through a conductor; in the case of embodiments of the invention, fluctuations of a flow continuum are employed to accelerate fluid current through a conduit or across a surface treated according to the invention. In Faraday's Law, greater magnetic flux increases electric current; according to the invention, greater pulse/noise/flux amplitude provides more fluid acceleration and laminar flow (or a higher degree of forward momentum).

The collection of the guide smaller ends defines a continuous curved inner line defining an effective inner wall of the tube that funnels gradually and smoothly from the entry end to the exit end. That curved inner line may be logarithmic or parabolic or another continuous curved line. A continuous outside line that tangentially contacts each of the guides outside of the tube may also be drawn between the guides. The outside line may also be straight, logarithmic, or parabolic or any other curved continuous line, though having a higher rate of curvature than does the inner curved line.

Gas passing rapidly past the guide cavities induces a domain of axial fluid movement close to the continuous curved inner line, allowing forces resulting from fluid expansion to enter a cavity, whereupon it is allowed to expand, rotate, reflect and mix. That is, momentum-accumulating rotor effects causes a Bernoulli effect reducing pressure within the cavities. Because the mouth of the guides are large, a vortex is induced☐ from a shearing interface between gases within the cavity and the main flow of gas moving down the tube translating kinetic energy from the main flow into the vortex of a respective cavity as well as shedding the overspilling or shedding portion in a relaying effect to successive downstream cavities.

It has been empirically shown that when the tube is installed as an automotive exhaust pipe, gas exits the tube with reduced sound and more efficiently as measured by ☐increased increased performance, measured both in horsepower and in torque, as indicated in vehicle dynamometer tests. It has also been shown empirically that when the tunnel is employed as a chute, solid items such as fruit or balls and other particulates depending on their size and the corresponding configuration of the tubular version of the embodiment, may become transported through while suspended or may be drawn into some or many of the cavities and routed into or separated from the primary flow, thus☐ preserving the fruit or other item from damage from the side of the tube. It is therefore concluded that the vortices work to form a buffer from the tube inner walls, hence providing a mode of object, particulate, viscosity, slurry or other object separation where their respective sizes cause them to be separated or strippedaway from a primary flow (throughput fluid jet). The result then is an outer layer of gas moving past the vortices and the tunnel interior wall slower than the inner flow of gas nearer the center of the tube. The inner layer then comprises the observed buffer to the inner flow of gas and objects in the inner flow When installed as part of an engine exhaust pipe as mentioned above, the device has been found to be an effective muffler without using conventional baffles and silencers that seek to cancel shockwaves, in a manner consistent with cavity resonance effects. Expansive forces are utilized or expended as a motive force to accelerate a fluid jet axially, so if used their expansive potential lowers the potential amplitude of sound or compression waves, thereby reducing sound without using conventional baffling. It has also been found that a change in the dimensions of the guides changes engine exhaust sound, usually lowering an audible frequency or pitch; when used as a ballistic arms silencer, the acoustic bass response is deeper. The silencer's flashpoint length is also extended, indicating compression waves have expanded. Expanding waves are characteristic of an expansion chamber effect, but waves being stretched along a trajectory (such as sound/light, are characteristic of Doppler Shift). The inventor suggests that the guides induce a density gradient with heavier particles moving to the center of the gas flow and lighter particles moving outward toward the tube interior surface and the vortices. It is suspected that this organization of particles reduces or eliminates compression waves that are found in conventional automobile exhaust systems. Specifically, as a fluid jet moves through a tunnel or over a surface-treatment embodiment of the invention, cavitation effects caused by and within the guides reorganize fluid-dynamic forces in such a way that force vectors become aligned with the fluid jet's preferred direction of flow, thereby optimizing fluid movement and reducing heat and noise generation. Shockwaves of an initial flow continuum are employed as a motive force causing cavitation effects to become beneficial in accomplishing that optimization. It is also suspected that the funneling effect of the outer gas flow along the tube inner wall contributes to a partial destruction of compression waves in the exhaust. The outer gas layer also acts as a smooth boundary to the inner flow which promotes even flow to the inner flow.

In a preferred embodiment of the invention, a tube for moving gas between an entry end into which gas is introduced and an exit end through which gas exits the tube, the tube comprising a plurality of adjoining adjacent☐ guides, each guide comprising an outer half of a smoothly-curved, modified torus, and an outer rigid tube wall, is disclosed. According to the embodiment, each guide forms an internal cavity with a cavity mouth opening into an inner portion of the tube, the cavities shaped such that a vortex forms within each of the cavities as gas passes through the tube, and the flow of fluid in the tube is unidirectional and axial from the entry end to the exit end.

According to another embodiment, the tube further comprises a plenum between the outer rigid tube wall and a plurality of outer surfaces of the plurality of adjoining adjacent guides, the plenum further comprising a plurality of air inlets proximate to the inlet end of the tube, and an outlet nozzle at the exit end of the tube which is adapted to receive exhaust gas as it exits the tube. The passage of high-speed exhaust gases through the outlet nozzle causes a pressure drop that pulls in ambient air from the plenum, the flow of air from the air inlets through the plenum to the outlet nozzle acting to cool the external surface of the tube.

According to another embodiment, the tube acts as a muffler for an internal combustion engine. According to yet another embodiment, the tube acts as a silencer for a firearm.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
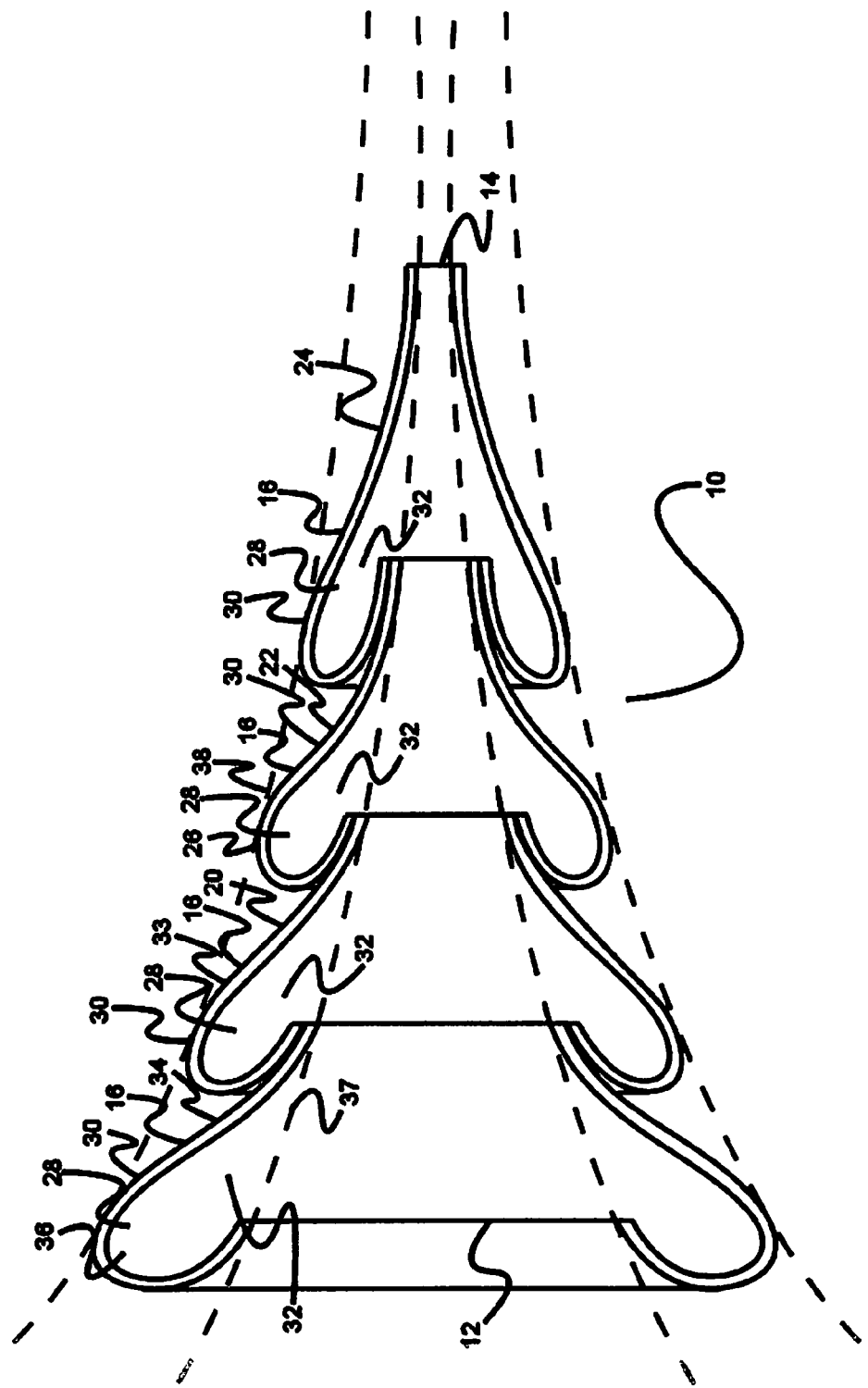
FIG. 1 is a longitudinal cross sectional view of a channeling gas flow tube, according to an embodiment of the invention.

The inventor has conceived, and reduced to practice, a channeling gas flow tube that addresses the challenges and problems in the art outlined above. Various techniques will now be described in detail with reference to a few example embodiments thereof, as illustrated in the accompanying drawings. In the following description, numerous specific details are set forth in order to provide a thorough understanding of one or more aspects and/or features described or referenced herein. However, it will be apparent to one skilled in the art, that one or more aspects and/or features described or referenced herein may be practiced without some or all of these specific details. In other instances, well known process steps and/or structures have not been described in detail in order to not obscure some of the aspects and/or features described or reference herein.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

DETAILED DESCRIPTION OF EMBODIMENTS

FIG. 1 is a longitudinal cross sectional view of a channeling gas flow tube, according to an embodiment of the invention.

According to the embodiment, tube 10 for moving gas 100 or for moving articles within gas 100 may be defined between an entry end into which gas 100 is introduced and an exit end through which gas 100 exits tube 10. Tube 10 comprises a plurality of adjoining adjacent guides 16, each guide 16 comprising an outer half of a modified torus☐ forming toroidal grooves opening inward. Each guide 20 is adjacent to a next guide 22, except of course the last guide 24, which ends the tube 10. The plurality of adjacent guides 16 connected together at their mouths forms a closed tube wall 26 with each guide 16 forming a cavity 28 with a cavity wall 30 around the cavity 28 and a cavity mouth 32 opening into tube 10.

According to a preferred embodiment, cavity wall 30 of guide 33 extends upward beyond its mouth 32; that is, toward entry end 12, over a next prior adjacent guide 34, again except a first guide 36 at the entry end 12 which is also shaped generally similar to the other guides but does not extend over a prior guide. The plurality of guides 16 is disposed such that the mouths 32 of guides 16 are aligned☐ along a curved inner line 37 between entry and exit ends 12, 14. The curved inner line 37 may be logarithmic or parabolic or another form of a continuous curved line. Also, an outer line 38 tangential to cavity walls 30 of said plurality of guides 16 outside of tube 10 is curved, which line may be logarithmic, parabolic or another form of a continuous curved line. Clearly, line 38 outside tube 10 has a curvature greater than curved inner line 36 past guide mouths 32.

Guides 16 are shaped such that a vortex 40 forms within each cavity 28 as gas 100 passes through tube 10, while promoting smooth flow through tube 10. Thus, cavity wall 30 of each flow guide 16 in extending past the next prior flow guide 34 loops back toward exit end 14 to taper into a smooth connection with that next prior flow guide 34. Guides 16 are generally nozzle shaped, with each successive guide being smaller than a next prior guide such that gas entering entry end 12 is funneled through tube 10 and out exit end 14, which is smaller than entry end 12.

According to another embodiment, the plurality of guides 16 is disposed such that outer line 38 tangential to cavity walls of said plurality of guides outside of tube 10 is straight.

Figure 2:
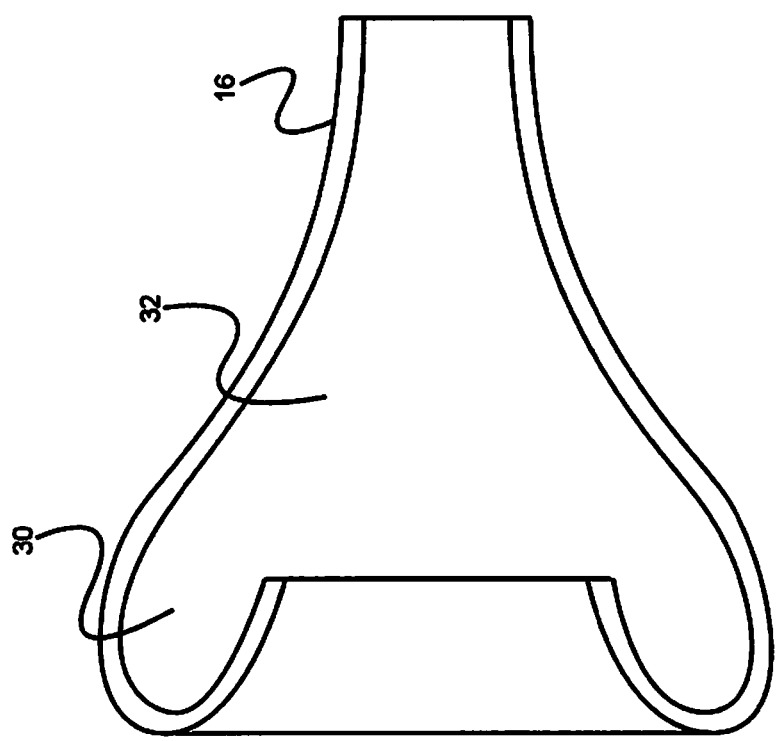
FIG. 2 is a longitudinal cross section view of a typical guide of which the tube of FIG. 1 is comprised.
Figure 3:
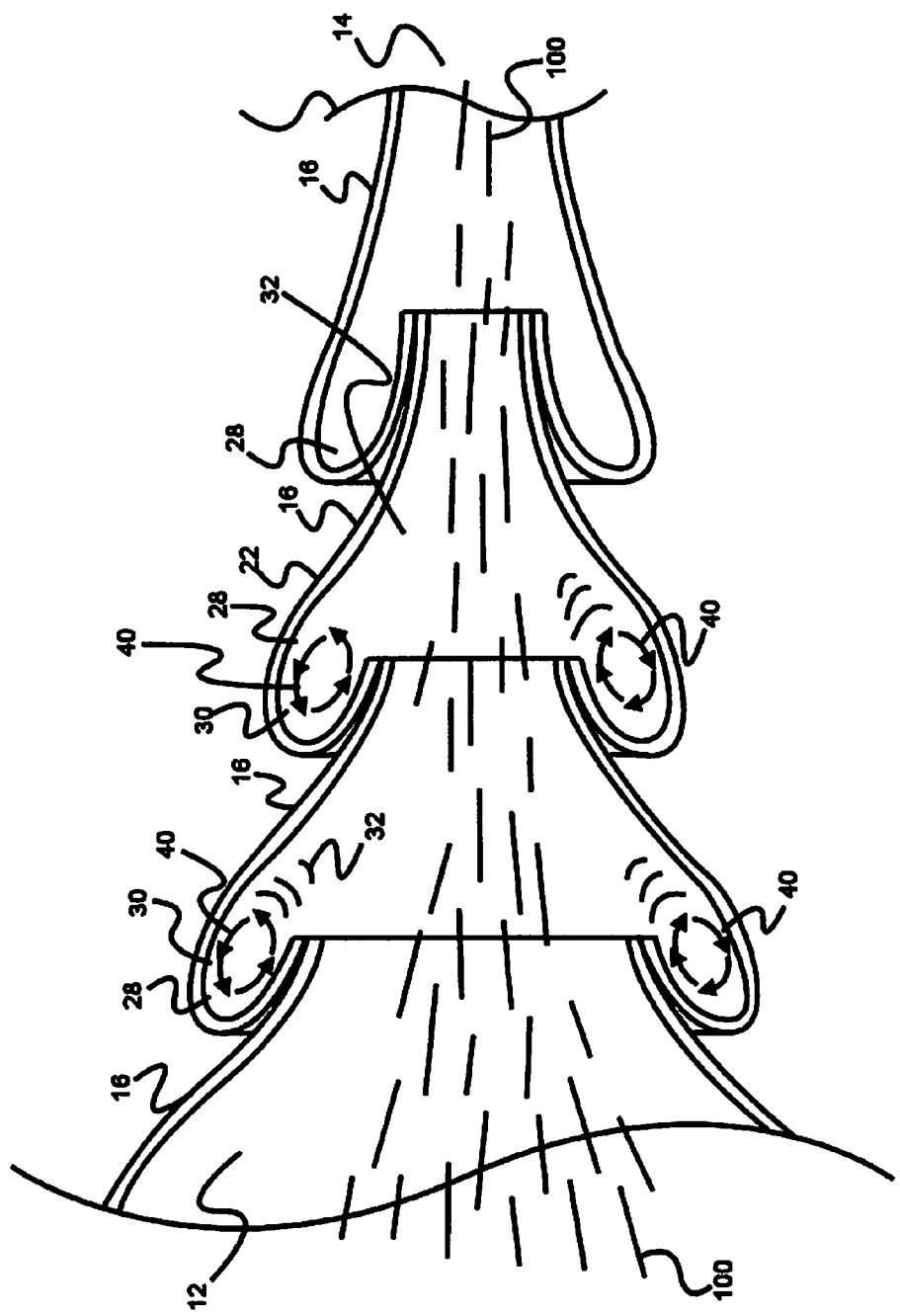
FIG. 3 is a longitudinal cross section view of a portion of the tube of FIG. 1 showing vortices in cavities of the respective guides comprising the tubes.

FIG. 2 is a longitudinal cross section view of a typical guide 16 of which the tube of FIG. 1 is comprised. FIG. 3 is a longitudinal cross section view of a portion of the tube of FIG. 1 showing vortices 40 in cavities of the respective guides comprising the tubes. According to the invention, vortices 40 are established shortly after flow 100 is commenced, with each vortex 40 arising naturally from edge effects of flow 100 when it encounters mouths 32 of cavities 28. It is one of the advantages of the invention that, once vortices 40 are established, and particularly when sizing of cavities 28 is accomplished as described above, the direction of flow in vortices 40 at mouths 32 is always in parallel with, and aligned with, the bulk of flow 100. Wind tunnel experiments conducted by the inventor have shown that this effect of vortices 40 results in development of a smooth boundary layer running substantially along line 37. This boundary layer may effectively entrain fluid in flow 100, thus accelerating flow 100 or reducing drag on flow 100 normally caused by normal edge effects experienced by a fluid flowing along a surface.

The vortex 40 formed inside cavity 28 is formed from the fluid flow 100 moving past cavity 28, and establishes a stable structure of fluid, with angular momentum that is also compressible. A compressible form, whether mechanical or fluidic in nature, is known to have the ability to absorb shocks (that is, shock waves or sudden, severe compressions waves). In the case of the stable fluid structure here, the absorbed shock is either transformed into additional rotation, or absorbed in the same manner as would be accomplished by a spring or mechanical shock absorber.

Figure 4:
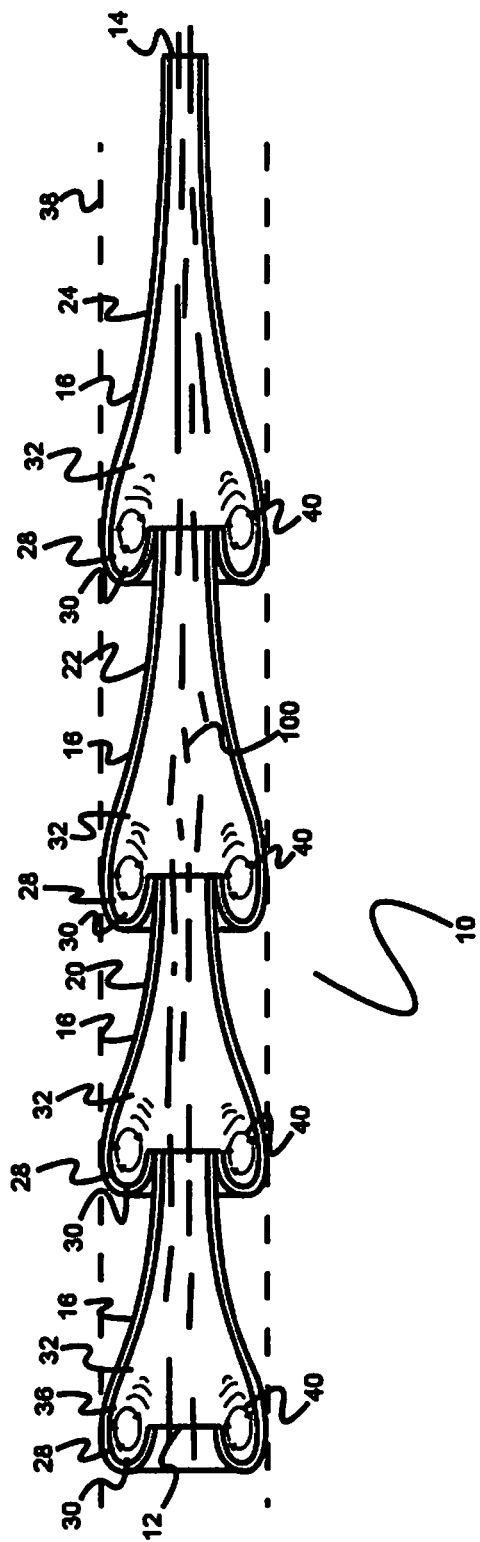
FIG. 4 is a longitudinal cross sectional view of an alternative embodiment of the invention, showing an external straight line comprised of a plurality of guides with cavities in which vortices are formed as gas passes the cavities.

FIG. 4 is a longitudinal cross sectional view of an alternative embodiment 10 of the invention, showing an external straight line 38 comprised of a plurality of guides 16 with cavities 28 in which vortices 40 are formed as gas passes cavities from entrance 12 to exit 14.

Figure 5:
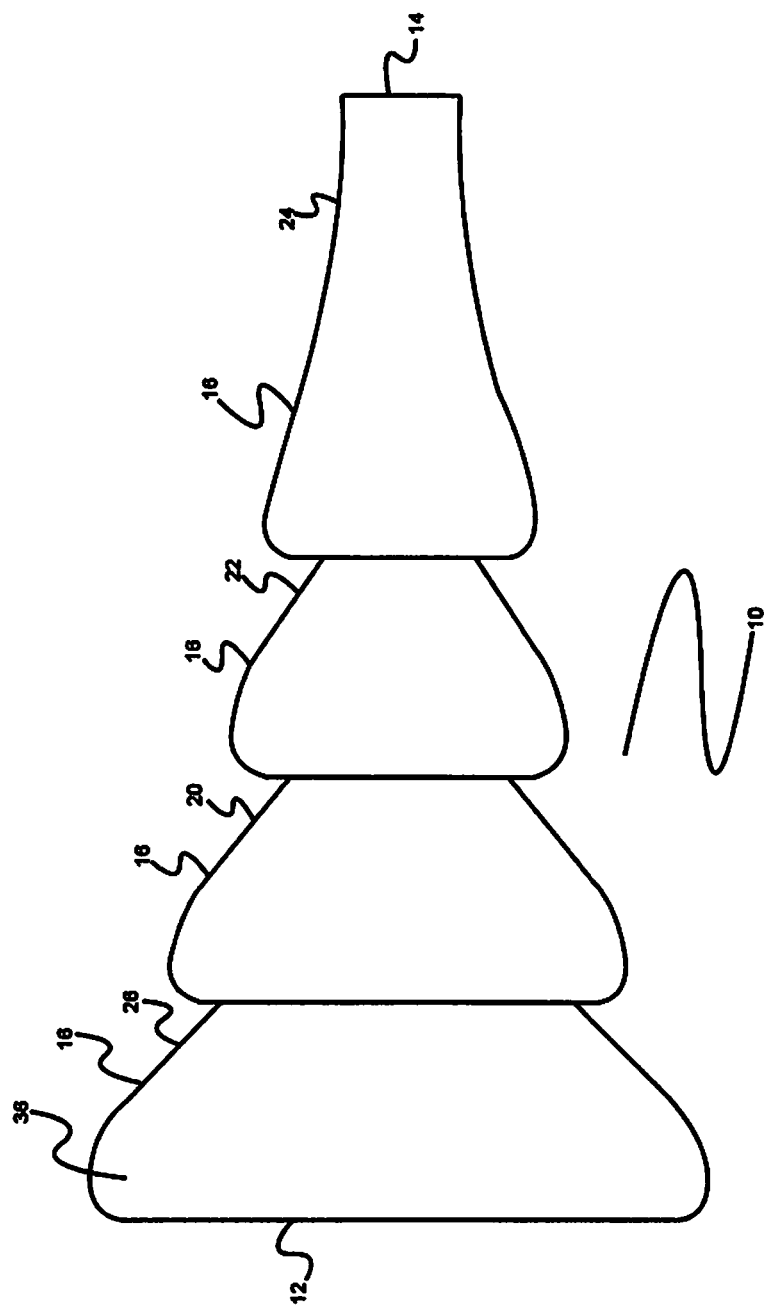
FIG. 5 is a perspective view of the tube of FIG. 1.

FIG. 5 is a perspective view of the exterior of tube 10 of FIG. 1.

Figure 6:
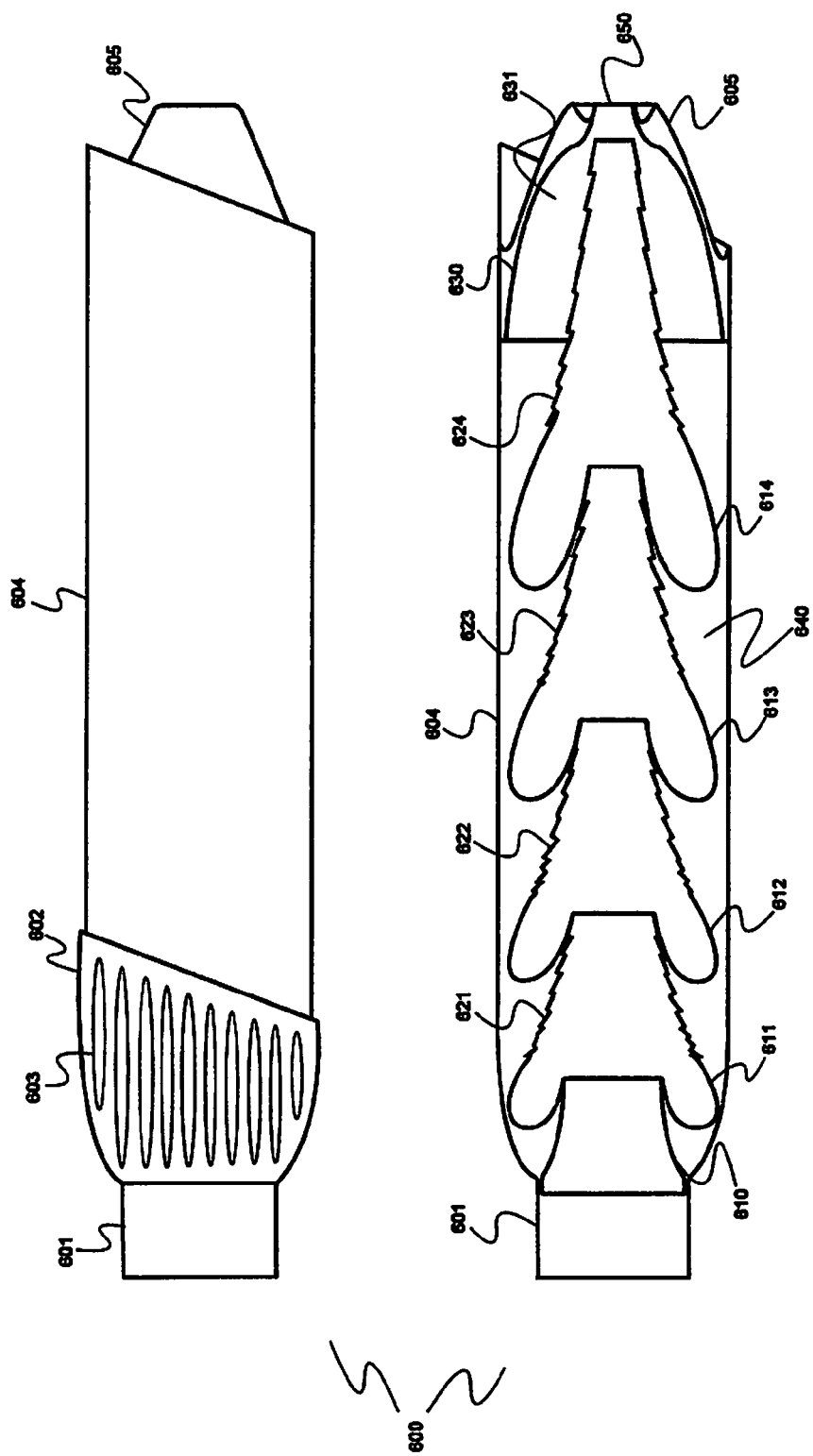
FIG. 6 is a diagram of a novel muffler design, according to a preferred embodiment of the invention.

FIG. 6 is a diagram of a novel muffler 600, according to a preferred embodiment of the invention. According to the embodiment, muffler 600 comprises a forward exhaust gas intake 601, a main body 604, and an exhaust gas exit 605 located distally from intake 601. Muffler 600 further comprises, at the forward (that is, distal from exit 605) end of body 604, an external shroud 602 which is penetrated by a plurality of air intake vents 603 generally aligned axially along shroud 602 (although other arrangements are possible; the arrangement shown is merely exemplary; furthermore, some embodiments may omit shroud 602 and vents 603 altogether). As in the case of tube 10 shown in previous figures, exhaust gas flows from intake 601 to exit 605 in a generally axial direction relative to muffler 600. Internally, muffler 600 is comprised of a plurality of guides 611-614 of progressively greater length (proceeding axially from intake 601 to outlet 605). Optionally, interior surfaces of guides 611-614 may be modified along their portions 621-624 that are downstream of each guide's vortex-inducing cavity, in effect harnessing a scaled-down version of the same effect as is used by the invention overall, to further smooth flow along the inner surfaces of guides 611-614. One role of the vortex rotation in cavities 611 is to act as a "mixer" that dissipates pressure pulses originating from for example an engine's exhaust by converting it, via the vortex, into orderly axial motion. Also optionally, when vents 603 are used, exit component 605 comprises an inner surface 630 shaped to form a nozzle 650 at the exit of the final guide 614, such that the passage of fast-flowing fluid (exhaust gases) through the nozzle will create a low pressure point and therefore entrain air that enters via vents 603 and flows through plenum 640 (formed between the external walls of guides 611-614 and the internal wall of main body 604). This axial of cooler ambient air, caused to flow by the vacuum created by nozzle 650, acts to cool external surfaces of muffler 600 and to also cool the exhaust gases exiting from final guide 614 and passing through nozzle 605. It has been found, as described above, that the entrainment of exhaust gases by the boundary layer cause by vortices 40 in guides 611-614 may actually draw a slight vacuum on an engine emitting the exhaust gases, in contrast to the usual effect of mufflers, which exert a back pressure on the engine, reducing its efficiency. Moreover, the embodiment may optionally be outfitted with a turbine shaft for a high-torque turbocharger, in which the shaft extends forward and outside of the embodiment to drive a pump for a secondary air injection (turbocharging).

Figure 7:
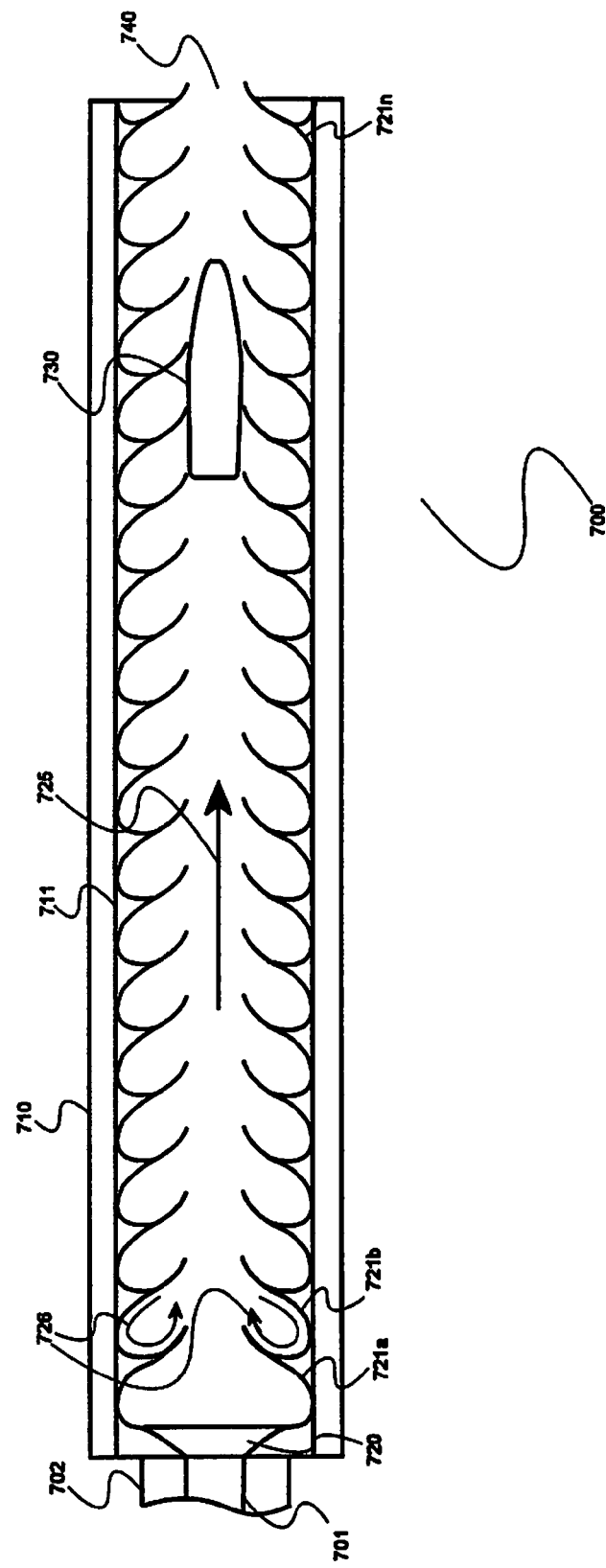
FIG. 7 is a diagram of a novel firearm silencer design, according to an embodiment of the invention.

FIG. 7 is a diagram of a novel firearm silencer 700, according to an embodiment of the invention. According to the invention, silencer 700 is placed at the open business end of a gun barrel 702, and admits both bullet 730 and high velocity gases 725 contained within inner wall 701 of barrel 702 at intake 720. Silencer 700 comprises an external rigid tubular wall 710, which encloses a cylinder defined by its inner wall 711. Aligned along inner wall 711 are a plurality of guides 721a-n, each of which operates as described above to establish vortices 726 that in turn act, via each cavity's mouth, to align force vectors axially along the interior of the cylinder through which bullet 730 passes. Importantly, shock waves present in gases 725 exiting a gun's barrel 702 after firing of bullet 730 are dissipated by the action of the plurality of guides 721a-n, such that a substantial portion of the kinetic energy of such shock waves is dissipated by setting up vortices 726 (since prior to firing vortices 726 would not typically exist, each cavity 721a-n acts to reduce the energy of incident shock waves by receiving gases and establishing vortices 726. Furthermore, the aligned force vectors and the resulting smoothed boundary later moving axially may accelerate bullet 730. Moreover, it has been observed that exhaust gases exiting silencer 700 tend to be highly collimated, with the result that heat and sound are carried rapidly away from silencer 700 (and thus from the person who fired the gun). It is believed that this highly-collimated exit gas geometry, coupled with the incremental acceleration of bullet 730 by the conversion of shock waves into vortices 726 will serve to increase the range of a given ammunition type by establishing a higher bullet exit velocity and reducing drag when bullet 730 initially leaves silencer 700.

Figure 8:
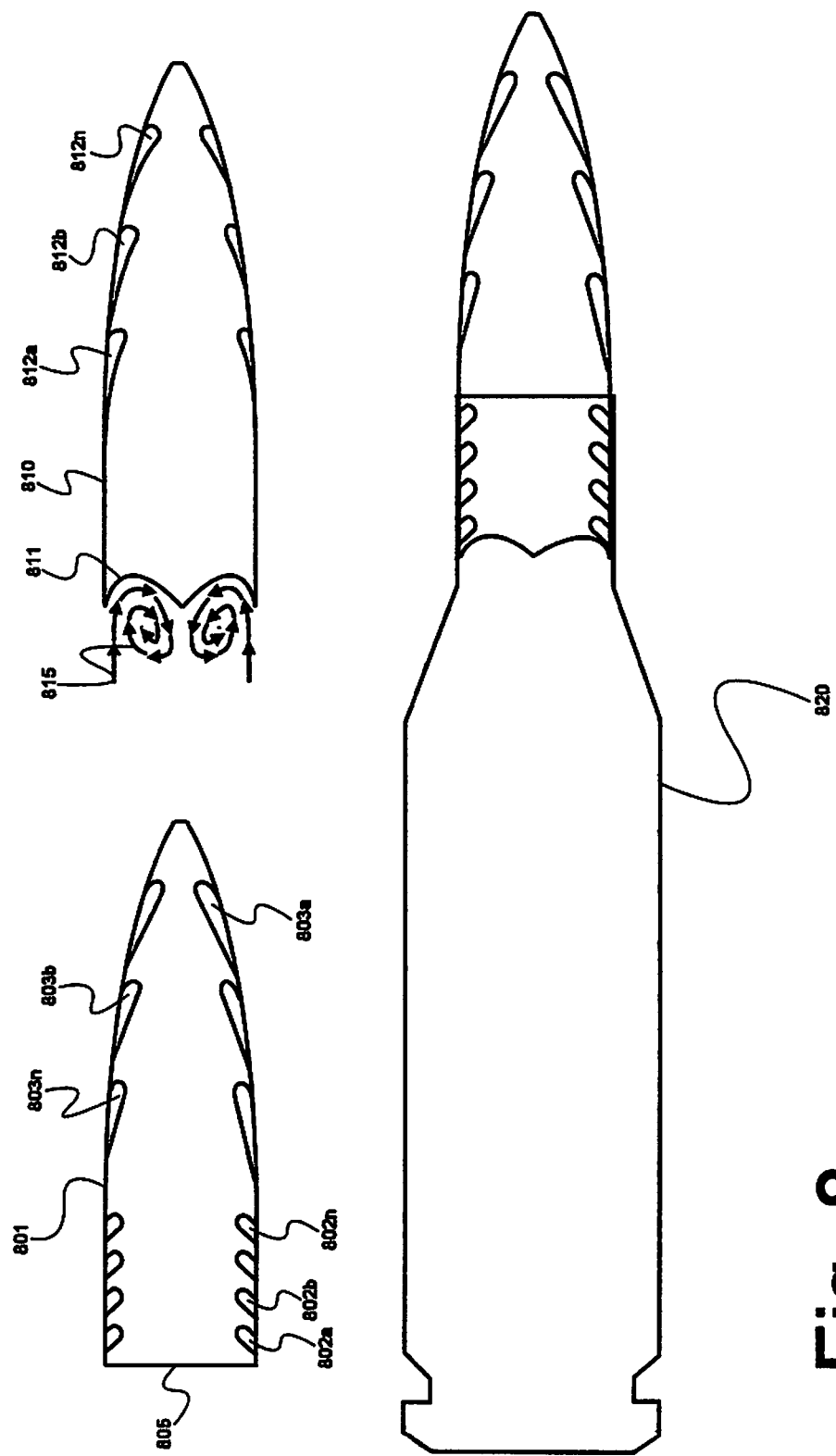
FIG. 8 is a diagram of a novel firearm ammunition design, according to an embodiment of the invention.
Figure 9:
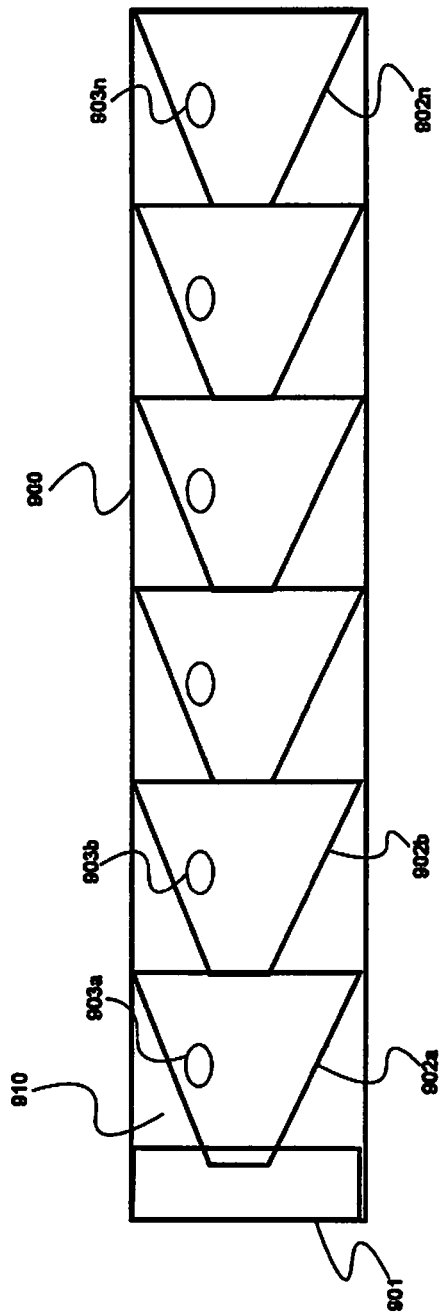
FIG. 9 (PRIOR ART) is a diagram of a K-type firearm silencer known in the art.

FIG. 9 (PRIOR ART) is a diagram of a K-type firearm silencer known in the art, and is provided to show how the modified silencer 800 of FIG. 8 differs from the prior art. Specifically, prior art silencer 900, of a type known as "K-type", comprises an entrance 901 that admits high-velocity gases from a gun barrel, and a series of truncated conical sections 902a-n, aligned axially along the length of silencer 900 with their bases oriented toward the forward (exit) end of silencer 900. Each section 902a-n further comprises a plurality of holes 903a-n which permit high-speed gases to exit into plenum 910, thus dissipating compression or shock waves by converting them into turbulent flows and thereby reducing a gun's acoustic signature when fired.

Comparing the prior art silencer illustrated in FIG. 9 with the silencer embodiment illustrated in FIG. 7, several important differences may be noted. Typical K-type gun silencers feature circular expansion vents into surrounding expansion chambers. The singular compression wave from the gun blast is allowed to gradually expand. By contrast, according to the embodiment, the silencer of FIG. 7 works in the opposite way, with different stage contours with drastically different fluid characterization, and without expansion vents. According to the embodiment, the object is to conserve all the energy of the shockwave and use it as a work function to accelerate the flow (and therefore also to accelerate bullet 730), instead of following the approach of conventional silencers by providing "dead-end" expansion chambers where kinetic energy is lost due to cancellation effects. Allowing compression waves to expand and cancel creates an energy conservation condition where thermal heat is generated. In the embodiment, less heat is generated because the kinetic energy moves through the embodiment to increase the velocity of exiting gases (and bullet 730). In effect, the embodiment's toroidal cavity is a temporary domain where compression waves are "invited" to occupy the space, expand, spin and roll ideally as a singular ring vortex, and then to apply its "traction" to the throughput jet-stream, thereby accelerating it. Ideally, all the kinetic energy of the pressure impulse of shockwaves is translated into axial acceleration.

Note that it is possible to reverse the orientation of cavities 721a-n and thereby to cause an increase in exit pressure and a corresponding decrease in exit velocity; such an approach may be useful for example for a steam wand in an espresso machine.

FIG. 8 is a diagram of a novel firearm ammunition design, according to an embodiment of the invention. Bullet 801 has been modified, according to the embodiment, in that bullet 801 comprises a plurality of cavities 803a-n and 802a-n similar to cavities 28 above. Cavities 802*a-n*, 803*a-n* are toroidal, each forming a complex surface of rotation around the centerline of bullet 801. Similar to the mechanisms described above, cavities 802*a-n*, 803*a-n* enable vortices to be established within their respective interiors. Cavities 803*a-n* are distributed along the curved forward portion of bullet 801, and cavities 802*a-n* are distributed along the cylindrical after portion of bullet 801. Collectively, these cavities 802*a-n*, 803*a-n* cause a smooth boundary layer to be established, as described above, and thus reduce aerodynamic drag on bullet 801. Similarly, bullet 810 comprises cavities 812*a-n* along its curved forward end, for the same purpose. Additionally, bullet 810 has a modified rear surface 811, which instead of being planar comprises a half-toroidal depression, which allows vortex 815 to form, thus reducing turbulence at the trailing edge of bullet 810 as it travels through the atmosphere. Finally, the lower part of FIG. 8 illustrates a complete round of ammunition comprising cartridge 820 and a modified bullet 801.

Figure 10:
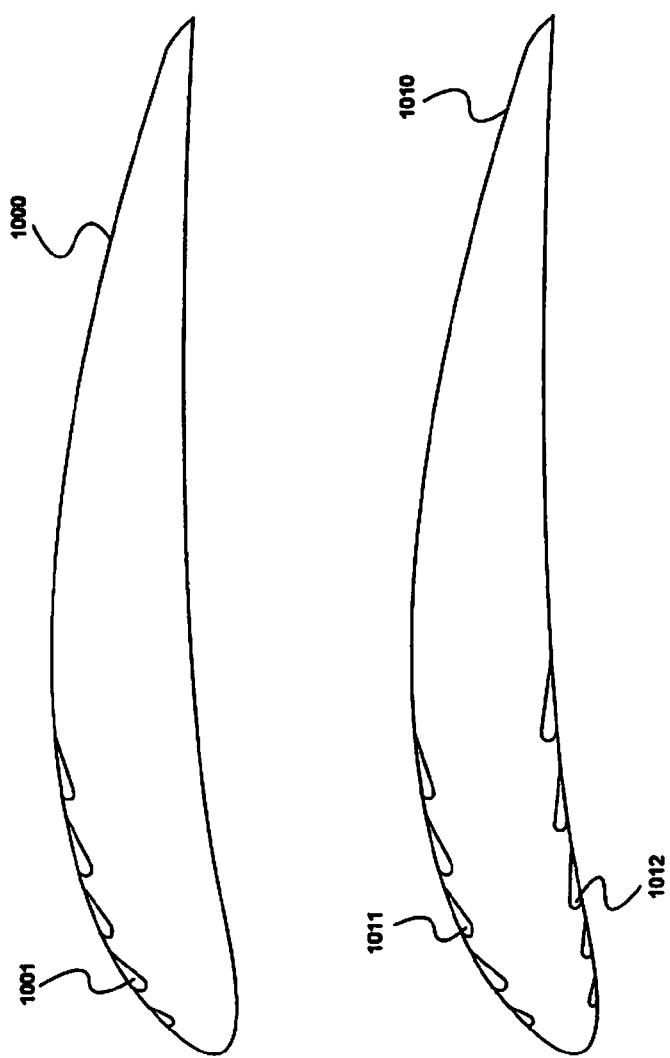
FIG. 10 is a cross-sectional view of an airplane wing or airfoil modified in accordance with an embodiment of the invention.

FIG. 10 is a cross-sectional view of two modified airplane wings (or airfoils), each modified in accordance with an embodiment of the invention. According to the embodiment, airfoil 1000 is conventional in design, but further comprises a plurality of cavities 1001 along its leading upper edge. Cavities 1001 act in the same fashion as cavities 28 described above, establishing vortices within the cavities and thus facilitating establishment of a smooth, low-drag boundary layer along the upper surface of airfoil 1000. Since realignment of force vectors by vortices within cavities 1001 will tend to accelerate fluid (i.e., gas) flowing along the upper surface, not only will drag forces on airfoil 1000 be reduced, but also lift will be improved since there will be a greater pressure differential between the lower and upper edges of airfoil 1000 compared to conventional designs. Airfoil 1010 is similarly conventional in design, except that it further comprises two set of cavities 1011, 1012, one on the upper surface and one on the lower surface of the airfoil 1010. This arrangement serves to reduce drag forces acting to retard motion (to the left) of airfoil 1010 through the atmosphere, although at the cost of no net effect on lift (as compared with airfoil 1000, which has drag reduced by a lesser amount but also has enhanced lift properties). It will be appreciated by one having ordinary skill in the art that various configurations of cavities are possible, according to the invention, each with its own benefits, and any of which may be used according to the invention.

Figure 11:
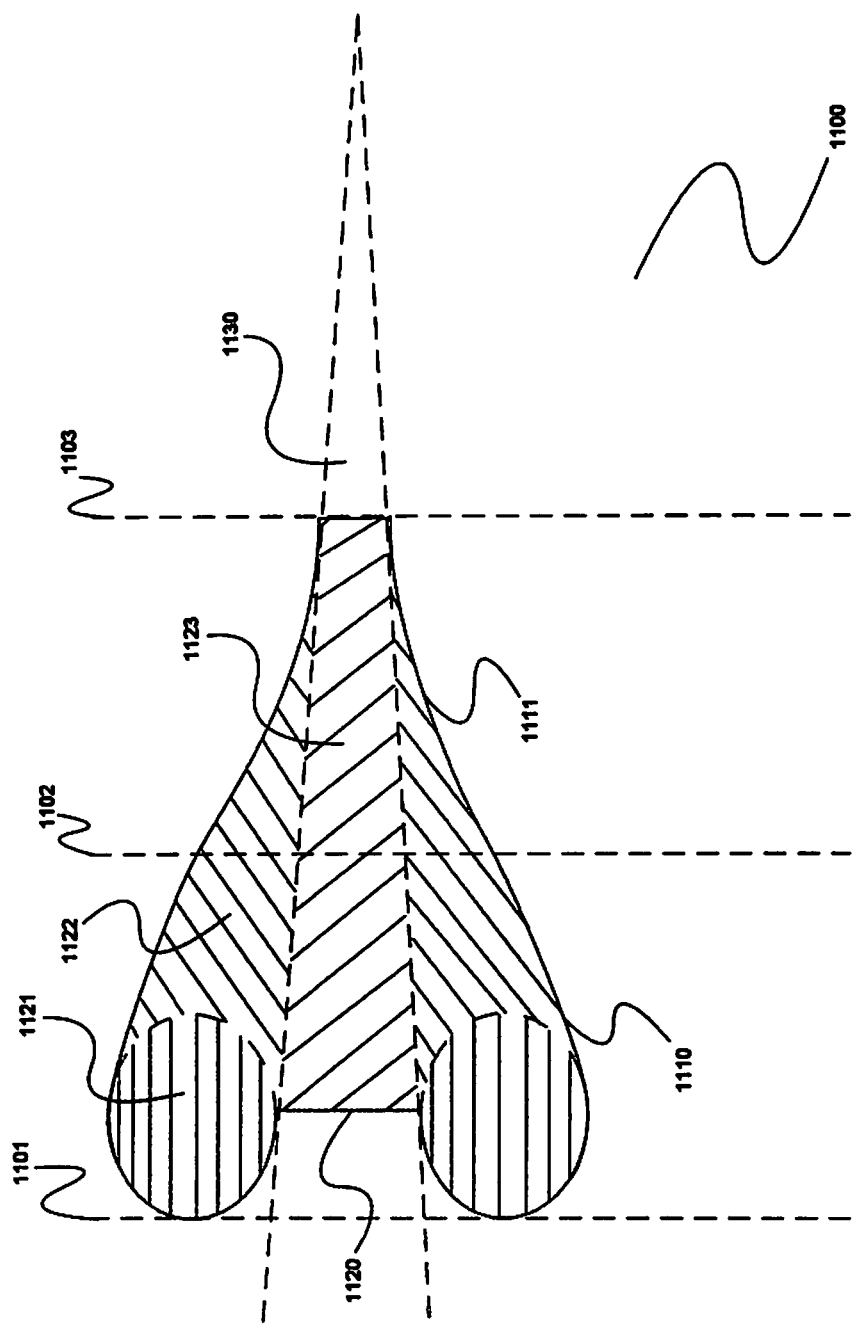
FIG. 11 is a diagram illustrating various aspects of a mechanism for converting turbulent flow into orderly flow, according to an embodiment of the invention.

FIG. 11 is a diagram illustrating various aspects of a mechanism 1100 for converting turbulent flow into orderly flow, according to an embodiment of the invention. FIG. 11 illustrates a single typical stage of a device such as that illustrated in FIG. 1, and is provided here for clairyt and more detail. According to the embodiment, gases (or any fluids) flow from inlet aperture or entrance 1120 through a tunnel volume 1123, exiting through an outlet aperture or exit along line 1103 and then displaying a thrust profile 1130 after exit (this profile may vary depending on operating point of the system). Volume 1121 is a typical cavity volume in which a vortex is established, and volume 1122 is a working volume with an outer wall comprised of a portion 1110 with a convex profile and a subsequent portion 1111 with a concave profile ("subsequent" in the sense that it is downstream relative to the gas flow 1123, which is shown going from left to right), the transition occurring at a point in length signified by line 1102.

Figure 12:
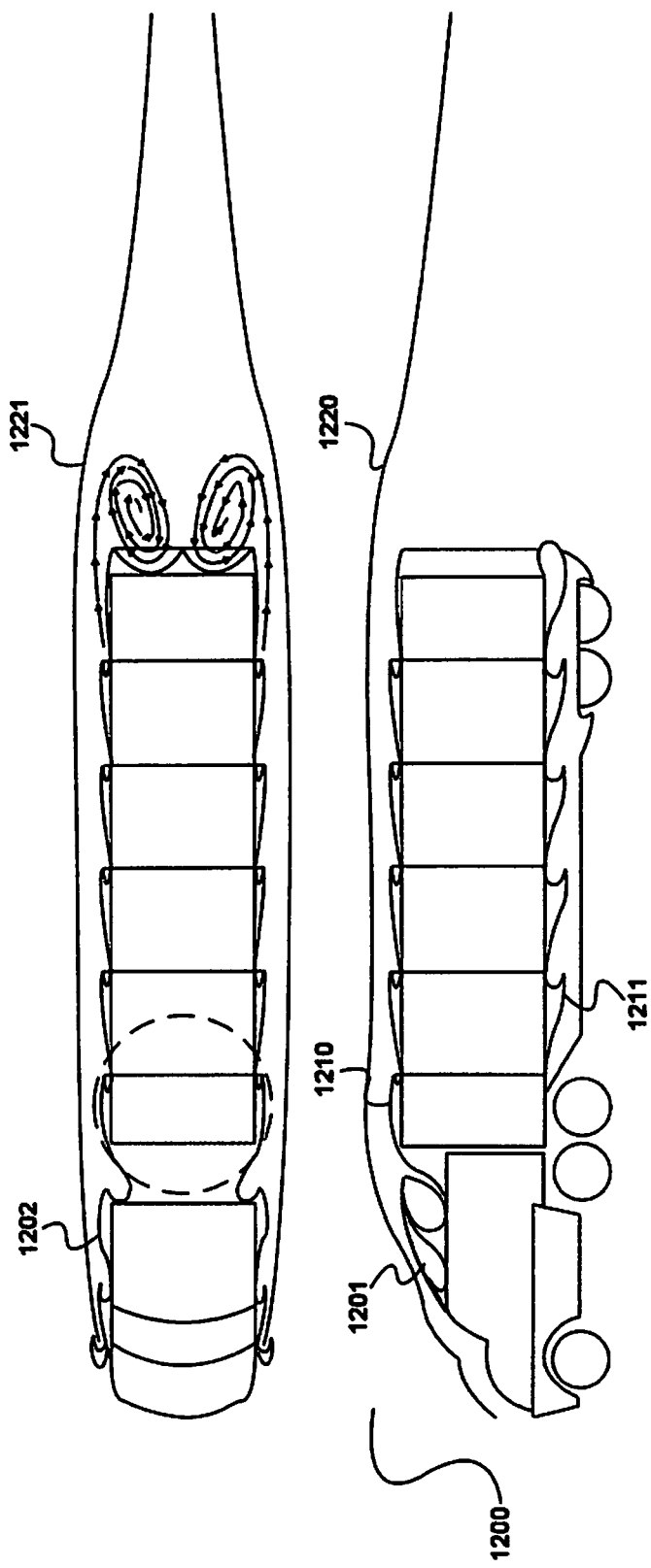
FIG. 12 is a diagram showing exemplary modifications to a truck to reduce drag and improve fuel efficiency thereof, according to an embodiment of the invention.

FIG. 12 is a diagram showing exemplary modifications to a truck 1200 to reduce drag and improve fuel efficiency thereof, according to an embodiment of the invention. According to the embodiment, various cavities may be established along various surfaces of truck 1200 along which air flow occurs during travel of truck 1200. For example, in some embodiments a truck's 1200 cab may be modified by the addition of vertical cavities on the top 1201 and sides 1202 of the cab, thus reducing drag caused by the atmosphere as the cab moves (to the left) during truck 1200 operation. Similarly, cavities 1210 may be placed on the top and sides of the trailer of truck 1200, and cavities 1211 may be placed on the underside of the trailer of truck 1200 as shown; in each case, such cavities act to reduce drag caused by airflow along the trailer as truck 1200 moves to the left. It will be appreciated by one having ordinary skill in the art that various removable containers are often used in place of a complete integral trailer unit in the trucking industry today (for instance, the ubiquitous shipping containers used on container ships). According to the invention, cavities may either be permanently mounted on such containers (in which case they would also serve to reduce drag on a moving container ship, since if many containers had cavities according to the invention, a smoother boundary layer between stacks of containers and the atmosphere may be established), or may be removably amounted prior to transport by truck. Finally, in some embodiments the trailing edge of truck 1200 (or of its trailer or of a mounted container), instead of being planar, comprises a half-toroidal depression, which allows vortex 1221 to form, thus reducing turbulence at the trailing edge of truck 1200 as it travels through the atmosphere.

Figure 13:
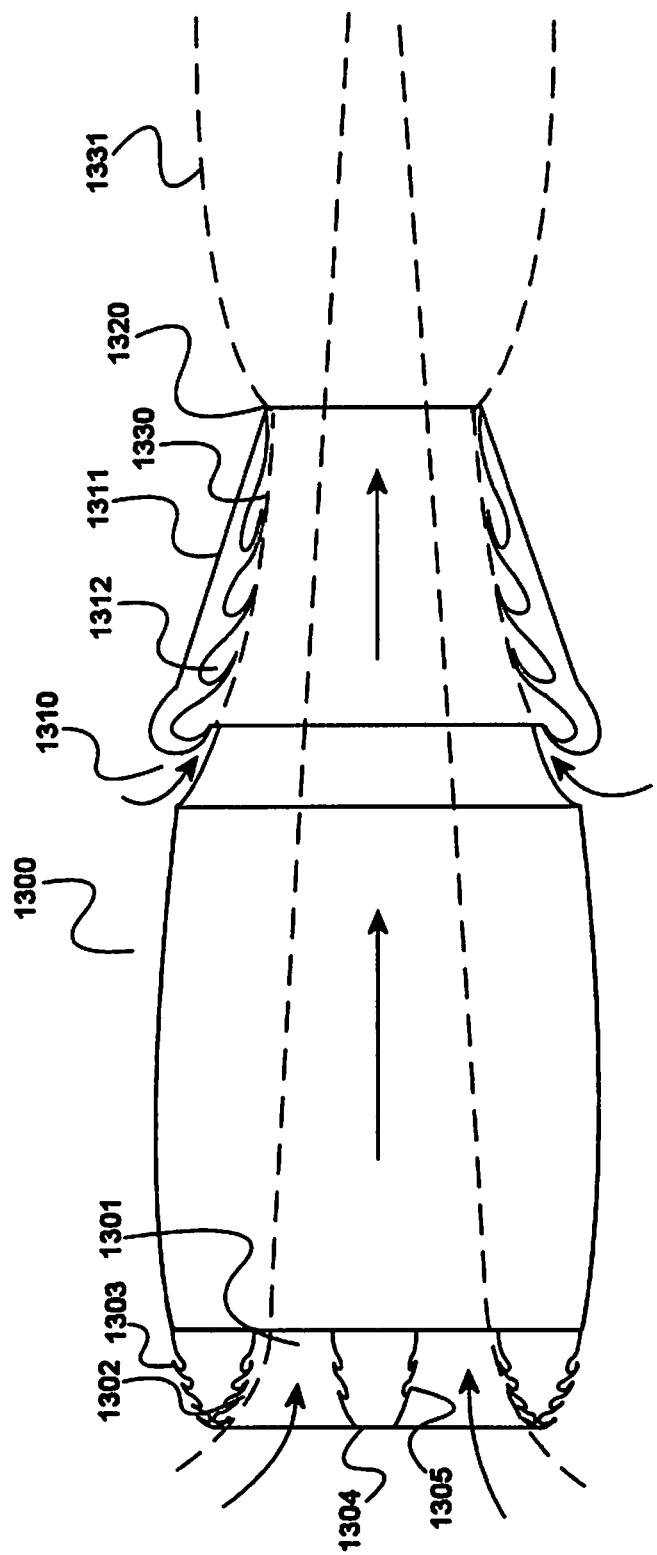
FIG. 13 is a diagram showing an exemplary modification of a jet engine to reduce turbulence and drag and improve fuel efficiency thereof, according to an embodiment of the invention.

FIG. 13 is a diagram showing an exemplary modification of a conventional jet engine 1300 to reduce turbulence and drag and to improve fuel efficiency thereof, according to an embodiment of the invention. As is typical with jet engines in the art, gases flow from left to right through inlet 1301 of engine 1300 and exit at outlet 1320 (whereupon they expand according to profile 1331). According to the invention, drag resulting from this flow may be reduced by modifying the forward end of the cowling of engine 1300 with a plurality of vortex-inducing cavities 1302, 1303. Those cavities 1303 on the exterior surface of engine 1300 reduce drag on the engine as it moves through the atmosphere, while cavities 1302 on the interior surface of the engine 1300 reduce drag that may slow down intake air, and thus improve engine efficiency. Similarly, in some jet engines known in the art, additional air intake is allowed at an inlet point 1310 forward of exhaust cowling 1311 in order to mix exhaust gases with cooler air, in order to reduce the temperature of gases exiting at point 1320 from engine 1300. According to an embodiment, a plurality of vortex-inducing cavities 1312 is provided on the internal surface of exhaust cowling 1330 in order to facilitate establishment (via methods discussed above) of a smoothed boundary layer flow 1330 that acts to reduce drag as well as to reduce turbulence in exit gases by enabling a smoother boundary layer 1331 just aft of the engine as it passes through the atmosphere.

Figure 14:
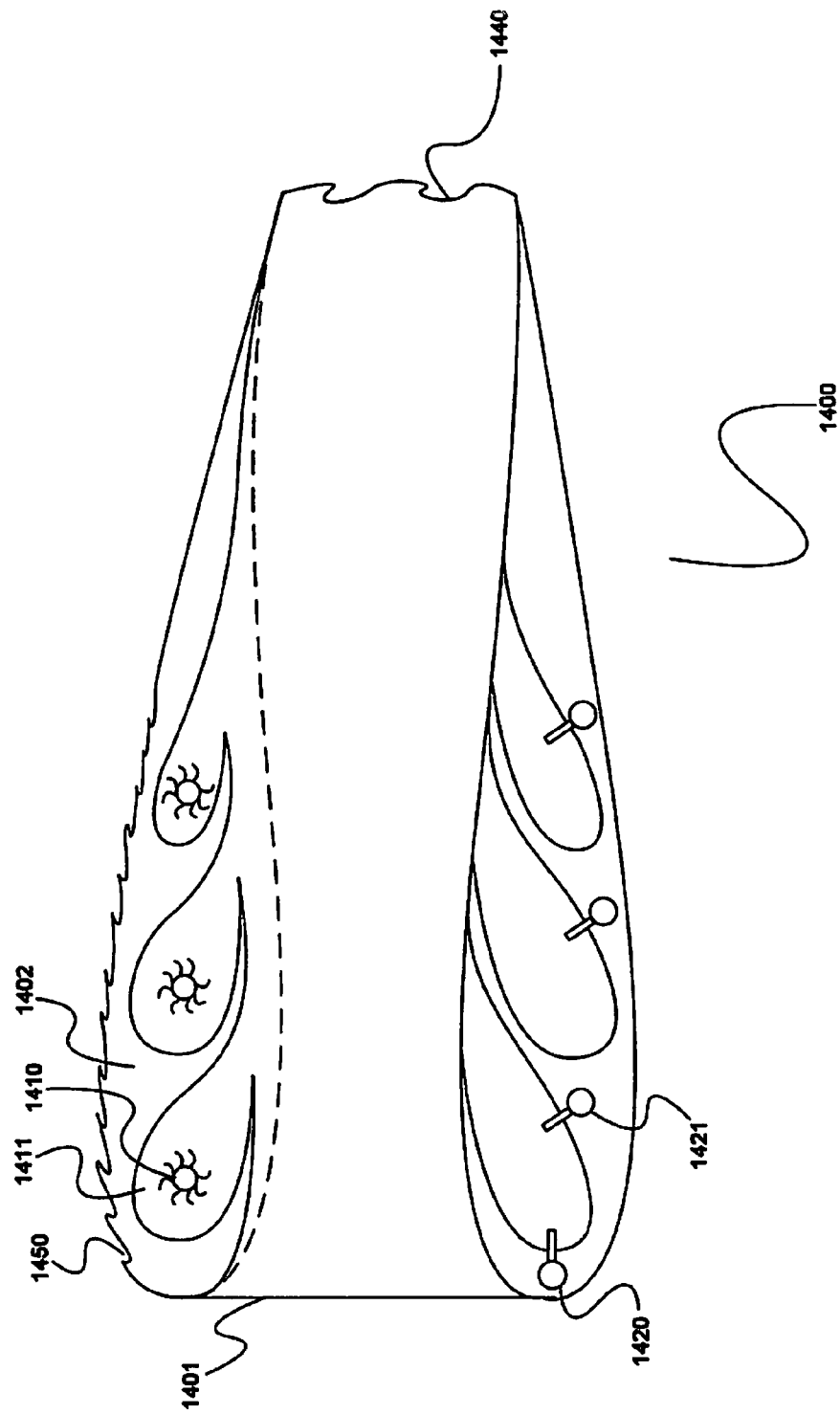
FIG. 14 is a diagram of a novel jet engine design according to an embodiment of the invention.

FIG. 14 is a diagram of a novel jet engine 1400 according to an embodiment of the invention. According to the embodiment, engine 1400 comprises a rigid exterior wall 1402 that is a solid of rotation whose cross-section is substantially an airfoil. A plurality of combustion cavities 1411, similar in nature to cavities 28 in FIG. 1, is arranged on the interior surface of external wall 1402. In a focal point of cavity 1411, a fuel injection ring 1410 is placed, which is penetrated by numerous fuel outlet nozzles, holes, or injectors. Fuel injection ring 1410 may further comprise one or more igniters to ignite fuel entering cavity 1411, or separate igniters may be provided at various locations along the inner surface of cavity 1411. As fuel is injected into cavity 1411, its combustion and expansion causes a vortex to emerge within cavity 1411.

Expanding combustion gases exit cavity 1411 in a substantially axial flow, thus creating a smooth boundary layer similar to those established according to previously discussed embodiments of the invention. Since expansion and acceleration of gases exiting to the right, in conjunction with the airfoil shape of external wall 1402, will pull ambient air in through inlet aperture 1401 and accelerate these gases toward exit 1440, thus accelerating engine 1400 (to the left) and any vehicle to which it is attached. Advantageously, in some embodiments cavities 1450 are provided on external surfaces of engine 1400 to reduce drag, similar to those described above with reference to FIG. 13. Various sensors 1420, 1421 may be placed at various points inside engine 1400 to assist in automatic control and measurement of engine operations. For example, sensors 1420 may be placed at a forward position within cavities 1411 in order to measure pressure, since pressure should be at a minimum when a proper vortex is established (because flow at sensor 1420 will be substantially parallel to the inner surface of cavity 1411, and will have high velocity due to low drag, and thus will induce a low pressure). Using such an arrangement, for example, fuel pressure may be adjusted into a particular cavity on a continuous basis in order to maintain pressure at sensor 1420 at a minimum, and therefore to ensure proper vortex maintenance within cavity 1411. Similarly, sensors 1421 at a point further aft in cavities 1411 could be used for monitoring pressures in order to assess engine operating conditions (and, of course, sensors 1421 could be used for the same purposes as sensors 1420).

An initial exhaust prototype for motorcycles with a straight guide profile demonstrated performance increases as described above. On another motorcycle, curvilinear guide surfaces produced a mellower and more pleasing sound, better attenuation, and improved engine performance. The inventor suspects that an effect analogous to that which is used advantageously in musical instruments occurs (specifically, trombones, trumpets, tubas, and other horns comprise curved geometries in their design. If more sound is consumed (attenuated) by an exhaust system according to the invention, it indicates that more compression waves have been employed as a motive force to accelerate gas, therefore better quieting may be used according to the invention as an indicator of better exhaust performance, and in some embodiments manual adjustments of tube 10 geometry (for instance, by changing spacing between guides) may be provided to allow users to "tune" their exhaust system for optimal sound and energetic performance.

Because it is well-known that toroidal vortices may become highly charged, such that their organizing structure becomes more resistance to decay, the application of a static or resonant electric field to cavities within various embodiments of the invention provides a novel control means for manipulation of fluid moving through various embodiments. For example, in the inventor's experiments it was noted that the presence of a resonant electric field applied to a tuned, metallic transducer in the vicinity of a cavity 28 imposed a field that caused evaporation of dew forming on an adjacent metal surface, without any other changing condition commonly associated with evaporation, such as increased heat or lowering of atmospheric relative humidity. The coupling of various embodiments with electric field controls may be used to control a variety of physical effects, especially by way of phase change when water vapor is present in a flow, in which the embodiment may be utilized as a novel evaporative system to absorb heat. Conversely, it has been observed that, when used with internal combustion engine exhaust, water vapor condenses into visible form from the outlet, when the guide design is slightly changed. Accordingly, in various embodiments of the invention, an output of a signal generator is connected to a high-voltage step-up coil or a voltage multiplier, the output voltage of which is connected to one or more guides 30, each guide 30 being electrically isolated from the others and from an exterior body 604 of the embodiment by an electrical insulator. Each stage receives a signal that imposes control and stimulates intensification of vortex 28 within cavity 30.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The skilled person will be aware of a range of possible modifications of the various embodiments described above. Accordingly, the present invention is defined by the claims and their equivalents.

What is claimed is:

1. A tube for moving gas between an entry end into which gas is introduced and an exit end through which gas exits the tube, the tube comprising:
   a plurality of adjoining adjacent guides, each guide comprising an outer portion of a smoothly-curved, modified torus whose inner wall has concave curvature on the gas inlet end and convex curvature on the gas outlet end and has an inflection point of curvature axially downstream of the inlet of the respective guide; and
   an outer rigid tube wall;
   wherein each guide forms smoothly curved internal cavity with a cavity mouth opening into an inner portion of the tube, the cavities shaped such that a vortex forms within each of the cavities as gas passes through the tube; and
   wherein flow of fluid in the tube is unidirectional and axial from the entry end to the exit end.

2. The tube of claim 1, further comprising:
   a plenum between the outer rigid tube wall and a plurality of outer surfaces of the plurality of adjoining adjacent guides, the plenum further comprising a plurality of air inlets proximate to the inlet end of the tube; and
   an outlet nozzle at the exit end of the tube which is adapted to receive exhaust gas as it exits the tube; and
   further wherein the passage of high-speed exhaust gases through the outlet nozzle causes a pressure drop that pulls in ambient air from the plenum, the flow of air from the air inlets through the plenum to the outlet nozzle acting to cool the external surface of the tube.

3. The tube of claim 2, wherein the tube acts as a muffler for an internal combustion engine.

4. The tube of claim 1, wherein the tube acts as a silencer for a firearm.

* * * * *